Dec. 13, 1960 R. T. HANGER 2,963,927
SELF ALIGNING DRILL MOTOR CLAMP
Original Filed Dec. 15, 1958 2 Sheets-Sheet 1
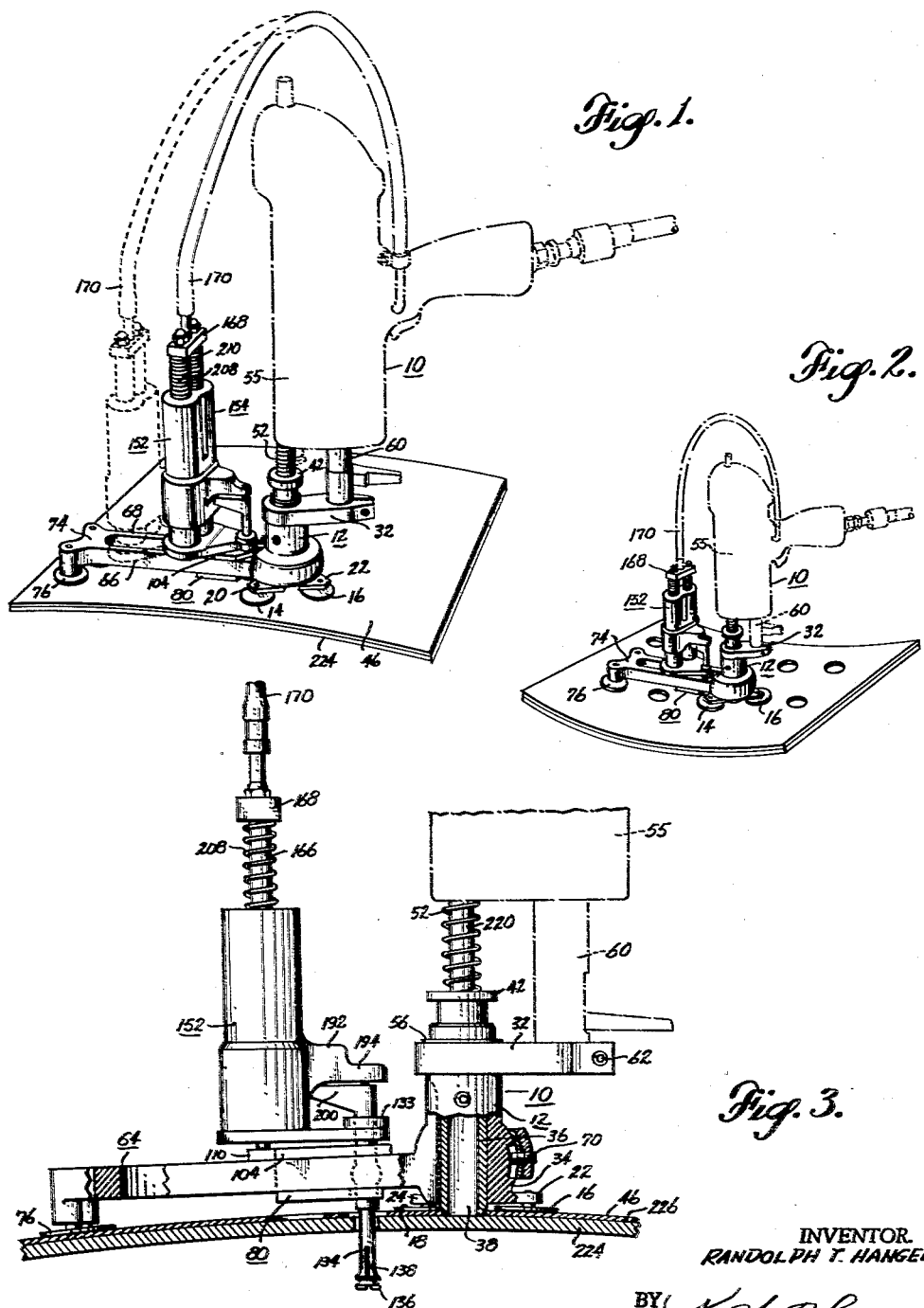
INVENTOR.
RANDOLPH T. HANGER
BY
ATTORNEY

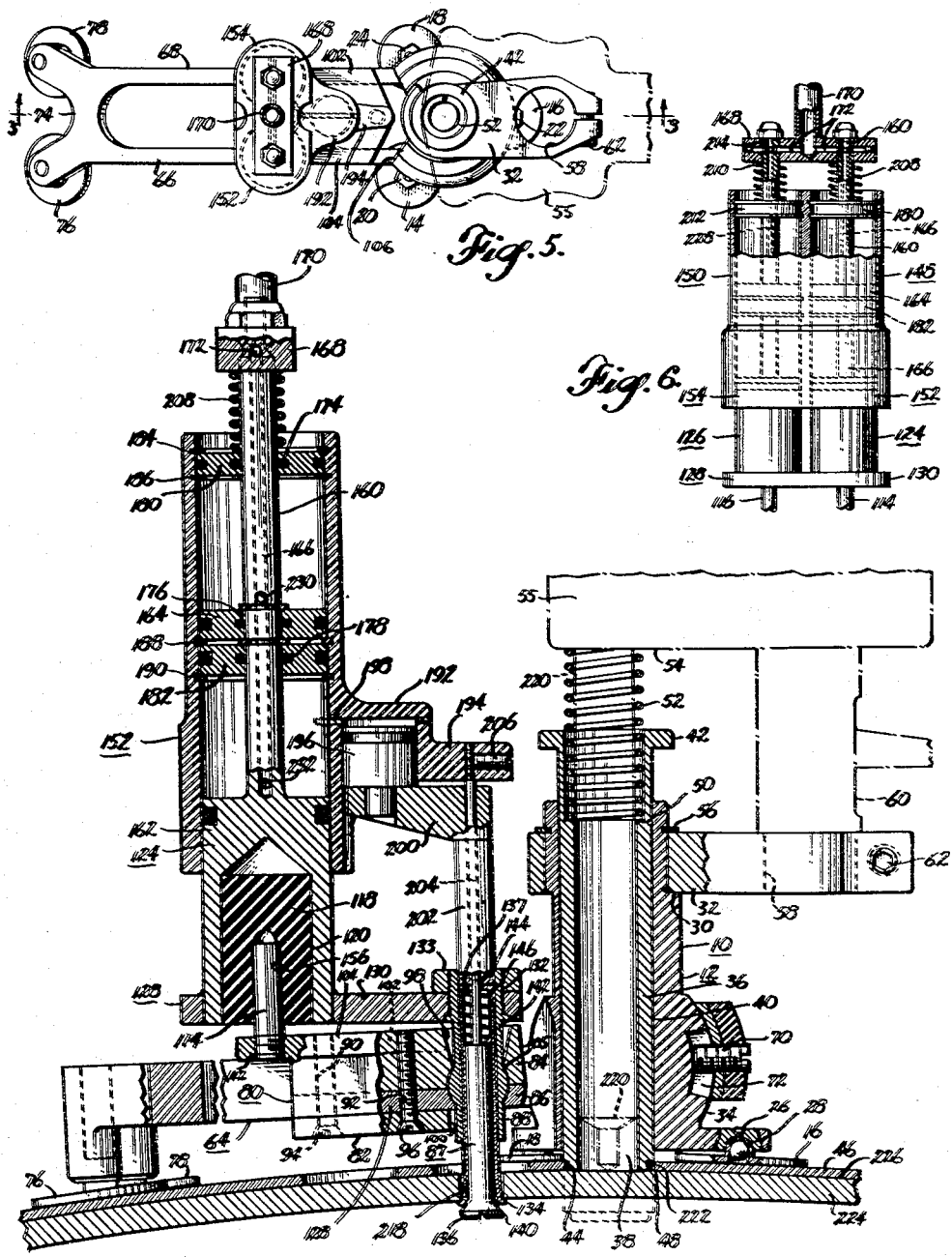

United States Patent Office 2,963,927
Patented Dec. 13, 1960

2,963,927

SELF ALIGNING DRILL MOTOR CLAMP

Randolph T. Hanger, Seattle, Wash., assignor to Boeing Airplane Company, Seattle, Wash., a corporation of Delaware Substituted for abandoned application Ser. No. 780,433, Dec. 15, 1958. This application Oct. 26, 1959, Ser. No. 848,763

5 Claims. (Cl. 77—13)

This invention relates to devices for the positioning and securing a drill motors relative to flat or curved surfaces and, more particularly, to a device for adjustably positioning a drill motor with or without the use of templates and for securing such drill motor for the drilling of holes within extremely close tolerances normal to a work surface.

This is a substitute application for application Serial No. 780,433, filed December 15, 1958, now abandoned, by Randolph T. Hanger, the same inventor.

This invention is of particular utility in the aircraft industry where the locating and drilling of holes within extremely close tolerances is a requirement. In certain of such drilling operations it is necessary that holes be drilled normal to work surfaces. The tolerances required in such cases are often extremely difficult to meet through the use of existing equipment. Extensive tooling involving utilization of drill plates or cages is generally required together with skilled drill motor operators who must exercise extreme care throughout the drilling operations. Even where these requirements are met, maintenance of close tolerances in positioning the drill normal to the work is difficult. Over-size holes are generated due to torque displacement, vibration, and angularity of the drill motor spindle with respect to the production surface. Further, random spacing of holes is not generally possible through the use of such drill plates or cage without provision of numerous pilot holes in the plate or cage. Where the surface of the work permits the application thereto of but a limited pressure during the drilling operation as is usually the case where honeycomb structure is involved, it is often necessary to rely upon measurements made relative to the drill cage or plate to gage the depth of the drilled hole. The necessity of referencing the depth of bore to such surface makes accurate gaging of hole depth difficult.

Although certain equipment utilizing indexing clamps is available for the locating and securing of drill motors relative to the work without the use of drill plates or cages, such equipment is not able to satisfy the requirements for extremely close tolerance drilling normal to the work surface, particularly where the surface of such work is of curved contour. The problem of precise measurement of the depth of the bore encountered with the use of drill plates or cages is likewise a problem here as is the generation of oversize holes.

Accordingly, it is an object of this invention to provide a device capable of accurately positioning and firmly securing a drill motor which will permit the drilling of holes within close tolerances normal to flat or curvilinear work surfaces.

It is another object of this invention to provide a device capable of adjustable indexing and accurately positioning and securing a drill motor with or without the use of templates for the drilling within extremely close tolerances of random spaced holes normal either to flat or curvilinear work surfaces.

A further object of this invention is to provide a device for positioning and securing a drill motor for drilling holes normal to a work surface which will furnish an extremely accurate gage of the depth of the drill bore.

A still further object of this invention is to provide a device of the character described which will eliminate the need for drill cages or plates in close tolerance drilling of holes normal to flat or curvilinear work surfaces and which will nevertheless exert only a limited pressure upon such work surface during the drilling operations.

Another object of this invention is to provide a device of the character described which will be simple and reliable in its operation, not requiring the use of highly skilled labor with its attendant high cost.

Other objects and a fuller understanding of the invention may be had by referring to the following description and claims, taken in conjunction with the accompanying drawings, in which:

Fig. 1 is a perspective view illustrating this invention in use for the purpose of positioning and securing such a drill motor relative to a convex work surface without the use of a template.

Fig. 2 is a perspective view illustrating this invention in use for positioning a drill motor relative to a work surface concave in shape with a template utilized for indexing purposes.

Fig. 3 is a partial longitudinal sectional view taken on line 3—3 of Fig. 5 illustrating a drill motor positioned through use of this invention, prior to the securing of such drill motor to the work.

Fig. 4 is a sectional view of a portion of this invention enlarged to illustrate the means utilized thereby for positioning and securing a drill motor normal to the work surface, the drill motor being positioned and secured relative to the work.

Fig. 5 is a top view of the apparatus embodying the teachings of this invention.

Fig. 6 is an end elevation of the cylinder portion of this invention with some parts in section.

Referring now to the drawings, the invention is generally designated by the reference character 10 and comprises an outer bushing 12 of cylindrical shape adapted for support normal to flat or curvilinear surfaces and utilizing three supporting disc-shaped feet 14, 16 and 18 mounted on outwardly extending arms 20, 22 and 24, respectively, at the lower end of the bushing 12 for swivel movement relative to the respective arms 20, 22 and 24. Mounting of feet is accomplished through use of threaded spherical headed pins 26 inserted in the slotted sockets 28 located at the center of the respective feet 14, 16 and 18 and in turn threadedly secured to the respective arms 20, 22 and 24. The outer diameter of the upper end of the outer bushing 12 is reduced to form a shoulder 30 against which clamp 32 abuts. Outer bushing 12 is provided at its lower end with an outwardly extending circumferentially disposed spherical surface 34.

A cylindrical shaped indexing bushing 36 having a bore 38 therein is disposed in the bore 40 of the outer bushing 12 for reciprocal movement relative thereto. At its upper end the indexing bushing 36 is provided with an outwardly extending flange 42 and at its lower end with a shoulder 44 adapted to rest upon a template 46 when the indexing bushing 36 is inserted in a guide hole 48. Chamfering of the lower end of the indexing bushing 36 as shown facilitates such insertion. A shoulder 50 at the upper end of the indexing bushing 36 provides a bearing surface for spring 52, the upper end of which spring 52 bears against a drill motor housing 54, which houses a drill motor 55.

Secured to the outer bushing 12 through use of snap ring 56 and abutting the shoulder 30 is clamp 32 having a bore 58 for reception of an accessory support 60, the support being secured in the clamp 32 through the of clamp screw 62.

Beam 64, comprised of elongated parallel bars 66 and 68, is disposed at one end about the spherical surface 34 of the outer bushing 12 in a ball and socket arrangement which effectively connects the outer bushing 12 and the beam 64 but nevertheless permits their swivel movement relative to each other. Guide pin 70 threadedly secured to the beam 64 and riding in a vertically disposed slot 72 in the spherical surface 34 of the outer bushing 12 limits the swivel movement of the beam 64 relative to the outer bushing 12. Beam 64 with the parallel bars 66 and 68 connected by cross member 74 at its other end is adapted for support upon curvilinear surfaces and utilizes therefore swivel mounted disc-shaped feet 76 and 78 similar to and mounted in the fashion of the feet 14, 16 and 18 of the outer bushing 12.

Carried by the beam 64 is an indexing clamp supporting block 80, which is disposed for reciprocal movement relative to such beam. This supporting block 80, which for convenience of manufacture, is indicated as comprised of three separate members 82, 84 and 86, provides for the adjustable support and swivel movement of the indexing clamp 87, having a sleeve 88.

Bores 90 and 92 are provided in the members 82, 84 and 86 for receipt of screws 94 and 96, such screws being threadedly engaged with the member 84. A third bore 98 is provided in the members 84 and 86 for receipts of the indexing clamp sleeve 88. The upper portion of the bore 98 is uniformly tapered outward and upward while the lower portion uniformly tapers outward and downward. The central portion of bore 98 is of spherical shape to receive the sleeve 88 and its spherical surface in a ball and socket arrangement, the taper of the upper and lower portions of such bore permitting the sleeve 88 swivel movement. Member 82 is further provided with a semicircular cutout 100 preventing its interference with such swivel movement of the sleeve 88.

Channel shaped member 86 is provided with outwardly extending flanges 102 and 104 disposed to ride upon the parallel rails 66 and 68 of beam 64 thereby providing support for the indexing clamp supporting block 80. Both member 84 and the member 86 adjacent thereto are bevelled adjacent the outer bushing 12 to permit positioning of the indexing clamp supporting block 80 close to the outer bushing 12 as illustrated in Fig. 4, a mating recess 106 therefore being provided in the outer bushing 12 as shown in Fig. 5. Member 84 of generally rectangular cross-section nests in member 86 and has mounted at one end thereof a T-shaped member 112. Threadedly secured in either arm of T-shaped member 112 are damping pins 114 and 116 which interact with resilient material 118 in the recesses 120 and 122 of piston assemblies 124 and 126, respectively. Member 82 of rectangular cross section is secured to the underside of the web 128 of member 86 by the screws 94 and 96, and as secured, member 82 abuts the underside of rails 66 and 68 in a jaw-like relationship with the flanges 102 and 104 of member 86 effectively tieing down the supporting block 80 to the rails 66 and 68 of the beam 64. Such arrangement although preventing transverse movement of the supporting block 80 relative to the beam 64, nevertheless permits the supporting block 80 to move longitudinally of the beam 64 guided by the rails 66 and 68. The freedom of the supporting block 80 to move longitudinally relative to the beam 64 will of course be governed by the clearances between the rails 66 and 68 and the members 82 and 86 of supporting block 80.

Sleeve 88 functions to permit swivel movement of indexing clamp 87 relative to the indexing clamp support block 80 and thus to the beam 64. Sleeve 88 further provides support for plate 128 having an outwardly extending flange 130 having a threaded bore 132 therein. Threaded engagement of the upper portion of sleeve 88 with the bore 132 and with the nut 133 secures the plate 128 to the sleeve 88 providing support for the plate 128 and the indexing clamp actuating assembly 87.

Intermediate its length sleeve 88 is provided with outwardly extending circumferentially disposed spherical surface 135 which surface, as indicated above, coacts with bore 98 of the support block 80 in a ball and socket arrangement to provide a swivel support for the sleeve 88.

Indexing clamp 87 comprised of collet 134 and mandrel 136 is disposed for reciprocal movement relative to the sleeve 88. Collet 134 is a cylindrical sleeve with an inwardly extending radial flange 137 at its upper end. At its lower end collet 134 flares outwardly with slots 138 being provided in such flared end to facilitate the expansion thereof when acted upon by the flared lower portion 140 of the elongated cylindrically shaped mandrel 136, the outer diameter of such flared lower portion 140 being approximately the same as the outer diameter of the collet 134 in its unexpanded condition. The upper portion of the mandrel 136 is reduced in diameter to form shoulder 142 and an elongated shank 144 threaded at its upper end. The mandrel 136 is disposed for reciprocal movement relative to the collet 134 and for cooperation therewith in effecting its expansion when the indexing clamp 87 is secured to the underside of the work. Compression spring 146 normally biases the flared lower end 140 of mandrel 136 away from contact with collet 134, the spring 146 bearing at its lower end upon shoulder 142 of mandrel 136 and at its upper end upon flange 137 of collet 134.

Fig. 4 illustrates a section through one of the piston and cylinder assemblies 148 and 150, the structure, operation and function of the two assemblies 148 and 150 being similar. The pistons 124 and 126 and cylinders 152 and 154 are carried in parallel relationship by the base plate 128. Typical piston 124 has the recess 120 in its base plugged with the resilient material 118 such as rubber, the resilient material 118 being provided with an axially disposed recess 156 for receipt of typical damping pin 114 threadedly secured to the supporting block member 80. The interaction of this pin with the resilient material 118 provides a damping action functioning to maintain the beam 64 normal to the axis of the piston 124 but permitting the beam 64 to move against the resilient bias of material 118. Typical piston assembly 124 is disposed for reciprocal movement relative to typical cylinder 152. Secured to a rod 160 for tandem action with a piston 162 is a second piston 164. Rod 160 has an axial bore 166 for the transmission of actuating fluid under pressure. At its upper end rod 160 is threadedly secured to manifold 168 which latter is in turn centrally secured to a supply line 170. Through the grooves 172 of manifold 168 the actuating fluid is transmitted to the bore 166 of rod 160.

Sealing is generally accomplished by rings 174, 176 and 178. Disks 180 and 182 are keyed to cylinder 152 through use of rings 184, 186, 188 and 190 inserted in annular grooves of the cylinder wall thus dividing cylinder 152 into two separate chambers which arrangement permits tandem action of pistons 162 and 164.

Projecting from the cylinders 152 and 154 and integral therewith is a cylinder 192 and a tapered arm 194 having a threaded bore therein. A piston 196 is disposed for reciprocal movement within cylinder 192 in response to the pressure of fluid ported through passageway 198 from cylinder 152. This piston 196 is secured to the tapered arm 200 of push rod 202 which rod butts against collet 134. Push rod 202 is provided with a bore 204 therein for receipt of mandrel 136 which is threadedly secured to tapered arm 194 for actuation thereby. Set screw 206 further secures mandrel 136 in arm 194.

Fig. 3 illustrates this invention with the indexing clamp 87 in its downward position. The indexing clamp 87 is normally biased in the extended position shown in Fig. 3 through the action of biasing compression springs 208 and 210, the lower ends of which bear upon disks 180 and 212, respectively (see Fig. 6), which are secured to cylinders 152 and 154, respectively, and the upper ends of which bear upon the underside of manifold 168 which latter, of course, is secured to the rods 160 and 214 of the piston assemblies 124 and 126, respectively. The biasing springs 208 and 210 urge the cylinders 152 and 154 downward together with the extending arm 194 and the mandrel 136 secured to arm 194. Arm 194 contacts arm 200 of push rod 202 forcing the push rod downward together with the collet 134 of the indexing clamp 87 against which it abuts.

For purposes of illustration, operation of the device of this invention will be described in conjunction with the use of the template 46. However, it is to be understood that the use of a template is not necessarily required, the template merely permitting more accurate indexing of the drill bit relative to the work. The drilling operation is begun with the drilling of a starting hole of sufficient diameter to permit insertion therein of the indexing clamp 87 in its unexpanded condition.

With the supply line 170 connected to the manifold 168, the indexing clamp 87 is inserted in the starting hole 218, the indexing clamp 87 prior to actuation being unexpanded and in the extended position shown in Fig. 3. Indexing bushing 36, which provides alignment for the drill motor spindle 220 and a convenient reference for gauging bore depth, is then inserted in the desired template hole 222 with its shoulder 44 bearing against the upper surface of the template 46. The outer bushing 12 is supported by the three swivel-mounted feet 14, 16 and 18 normal to the surface of template 46 and the work 224 thereunder thus positioning the indexing bushing 36 and the drill motor spindle 220 guided thereby, normal to the work surface. Disposition of the drill motor spindle 220 normal to the upper surface of the work 224 is assured even on curvilinear surfaces due to the arrangement of the feet 14, 16 and 18 of outer bushing 12 and their ability to swivably adapt themselves to such surfaces.

In positioning the indexing bushing 36 in the template 46, the distance between the indexing bushing 36 and indexing clamp 87 may be varied by moving the supporting block 80 longitudinally upon the rails 66 and 68 of beam 64. Movement of the beam 64 to adapt to the work 224 having a curvilinear surface 226 is permitted by the ball and socket joint which such beam 64 forms with outer bushing 12, the limits of such movement being determined by the travel of pin 70 in slot 72 of outer bushing 12.

Actuation of the indexing clamp 87 is next accomplished by supplying fluid through the supply line 170 to the manifold 168 from which it is transmitted through the manifold grooves 172 and the axial bores 166 and 228 of rods 160 and 214, respectively, to ports 230 and 232 in rod 160 and to similar parts (not shown) in rod 214. A portion of the fluid admitted through port 232 into cylinder 152 is transmitted therefrom through passageway 198 to cylinder 192. Piston 196 in cylinder 192 under the pressure of such fluid is forced downward against the biasing force of compression spring 146 which spring because of considerably less strength yields before springs 208 and 210. With the yielding of spring 146 piston 196 and push rod 200 move downward forcing collet 134 downward and into contact with mandrel 136, the flared end of which then causes the flared slotted periphery of the collet 134 to expand to a diameter greater than that of the starting hole 218 into which the indexing clamp 87 was initially inserted. With withdrawal from the starting hole 218 thus prevented, the fluid ported into cylinder 152 forces such cylinder upward against the bias of compressive springs 208 and 210, the pistons 162 and 164 acting in tandem. The upward movement of the cylinders 152 and 154 and the tapered arm 194 integral therewith carries the mandrel 136 to which it is secured upward, the mandrel 136 in turn carrying the collet 134 upward until the expanded outer periphery of such collet 134 bears against the underside of the work 224. Sleeve 88, permits swivel motion in the supporting block 80, and tends to swivably position itself and the indexing clamp 87 approximately normal to the work surface 226 when the expanded outer periphery of the collet 134 contacts the underside of the work 224. The resilient material 118 coacting with the pin 114 readily yields to the relative movement required as a result of such positioning between the supporting block 80, and the plate 128. With increased pressure exerted upon pistons 162 and 164 with the continuing admission of fluid to the cylinder 152, mandrel 136 draws the expanded collet 134 up tightly against the underside of the work 224. Piston assemblies 124 and 126 secured to the plate 128 and thence swivably supported by means of sleeve 88 carried by support block 80 and beam 64 are prevented from substantial downward movement and therefore ultimately force the beam 64 more tightly against the template 46. Such increased downward force upon the beam 64 is of course reflected at the outer bushing 12 swivably supporting such beam 64. It is thus seen that actuation of the indexing clamp 87 effectively secures the outer bushing 12 to the template 46 assuring that the drill motor spindle 220 is accurately and securely positioned normal to the work 224.

The drilling operation is next begun with actuation of the drill motor spindle 220. Although spindle feed may be accomplished in any suitable manner, a hydraulic or pneumatic pressure feed is utilized. With such arrangement the accessory support 60 as secured to the clamp 32 draws the drill motor housing 54 downward feeding the spindle 220 into the work 224 and exerting an upward movement which is resisted by the secured indexing clamp 87.

During the drilling operation the indexing bushing 36 is firmly held with its shoulder 44 bearing against the upper surface of the template 46 by the spring 52 bearing at its lower end against shoulder 50 of bushing 36 and at its upper end against the drill motor housing 54. Thus positioned, the indexing bushing 36 provides an excellent reference for gaging depth of bore and may be utilized in conjunction with an automatic drill motor shut-off switch (not shown) actuated on contact with the bushing 36 to stop rotation and feed of the spindle 220.

Upon completion of the hole drilling operation, the supply line 170 may be opened in any suitable manner to become a discharge line releasing the fluid from cylinders 152 and 154 and from the cylinder 192 communicating through passageway 198 therewith. The cylinders 152 and 154 under the biasing force of compressive springs 208 and 210, respectively, are thereupon forced downward carrying the mandrel 136 therewith and through exertion of pressure upon piston 196 forcing the collet 134 downward. When the pressure in cylinder 192 is sufficiently reduced, spring 146 forces collet 134 upward and away from contact with mandrel 136 permitting the collet 134 to assume its initial unexpanded condition.

The indexing clamp 87 may then be withdrawn from the starting hole 218 and secured to the hole just drilled or to such other appropriate hole as desired. However, if the location of the next desired hole is within the operating radius of the device of this invention as limited by the travel of the support block 80, the initial indexing clamp setting may be utilized for the drilling operation.

Since numerous changes may be made in the above apparatus and different embodiments may be made without departing from the spirit and scope thereof, it is intended that all matter contained in the foregoing description or shown in the accompanying drawings shall be interpreted as illustrative and not in a limiting sense.

I claim as my invention:

1. A device for positioning and securing a drill motor with a high degree of accuracy relative to flat and curvilinear surfaces comprising, in combination, supporting means for holding a drill motor spindle normal to a supporting surface, and clamping means including an indexing clamp and an indexing clamp support therefore for positioning and maintaining the supporting means proximate to said supporting surface, the clamping means being carried by the supporting means for swivel motion relative thereto, and the indexing clamp being disposed for independent swivel motion relative to the indexing clamp support.

2. A device for positioning and securing a drill motor with a high degree of accuracy relative to flat and curvilinear surfaces, comprising, in combination, supporting means for holding a drill motor normal to a supporting surface, and clamping means disposed for swivel motion relative to the supporting means including an indexing clamp and an indexing clamp support therefore for positioning and maintaining the supporting means proximate to the said supporting surface, the indexing clamp being thus disposed for swivel motion relative to the indexing clamp support and the indexing clamp support being capable of translatory motion relative to the supporting means.

3. A device for positioning and securing a drill motor with a high degree of accuracy relative to flat and curvilinear surfaces comprising, in combination, supporting means for holding a drill motor spindle normal to a supporting surface, clamping means including an indexing clamp for positioning and maintaining the supporting means proximate to said supporting surface and an indexing clamp support capable of translatory motion relative to the supporting means, the indexing clamp being mounted for swivel motion relative to the indexing clamp support and the clamping means being supported by the supporting means for swivel motion relative thereto, and resilient means functioning to align the clamping means to facilitate initial indexing of the device.

4. The device of claim 3 wherein the clamping means includes means for actuation of the indexing clamp, and the resilient means is interposed between the indexing clamp support and said actuating means.

5. A device for positioning and securing a drill motor with a high degree of accuracy relative to flat and curvilinear surfaces comprising, in combination, supporting means including an outer bushing adapted for receipt to an inner drill motor spindle indexing bushing, the outer bushing having a plurality of swivel-mounted supporting feet which maintain the outer bushing normal to a supporting surface and having a circumferentially disposed spherical surface thereon, and clamping means circumferentially disposed about said spherical surface of the supporting means to permit the supporting means to carry the clamping means for swivel motion relative thereto.

References Cited in the file of this patent

UNITED STATES PATENTS

| 2,283,722 | Chandler | May 19, 1942 |

FOREIGN PATENTS

| 2,499 | Great Britain | 1882 |